(12) United States Patent
Kim et al.

(10) Patent No.: US 12,416,560 B2
(45) Date of Patent: Sep. 16, 2025

(54) METHOD FOR MANUFACTURING LITHIUM ION SECONDARY BATTERY

(71) Applicant: LG ENERGY SOLUTION, LTD., Seoul (KR)

(72) Inventors: Min-Ji Kim, Daejeon (KR); So-Mi Jeong, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 252 days.

(21) Appl. No.: 18/027,973

(22) PCT Filed: Nov. 22, 2021

(86) PCT No.: PCT/KR2021/017204
§ 371 (c)(1),
(2) Date: Mar. 23, 2023

(87) PCT Pub. No.: WO2022/108411
PCT Pub. Date: May 27, 2022

(65) Prior Publication Data
US 2023/0375451 A1 Nov. 23, 2023

(30) Foreign Application Priority Data
Nov. 20, 2020 (KR) ........................ 10-2020-0157007

(51) Int. Cl.
*H01M 10/04* (2006.01)
*G01N 11/00* (2006.01)
(Continued)

(52) U.S. Cl.
CPC ........ *G01N 11/00* (2013.01); *H01M 10/0525* (2013.01); *H01M 10/0569* (2013.01);
(Continued)

(58) Field of Classification Search
CPC ...... G01N 11/00; H01M 10/00; H01M 10/04; H01M 10/05; H01M 10/0525;
(Continued)

(56) References Cited

U.S. PATENT DOCUMENTS

| 7,659,036 B2 | 2/2010 | Kim et al. |
| 2004/0139587 A1 | 7/2004 | Sato et al. |

(Continued)

FOREIGN PATENT DOCUMENTS

| JP | 8-124561 A | 5/1996 |
| JP | 2005-19157 A | 1/2005 |

(Continued)

OTHER PUBLICATIONS

International Search Report (PCT/ISA/210) issued in PCT/KR2021/017204 mailed on Mar. 2, 2022.

(Continued)

*Primary Examiner* — Nguyen Q. Ha
(74) *Attorney, Agent, or Firm* — Birch, Stewart, Kolasch & Birch, LLP (57) ABSTRACT

A method for manufacturing a battery. According to the method, a combination of binder resin composition material and an organic solvent (electrolyte) that causes low dissolution of a polymer in the resin may be selected. The selected binder resin composition material, organic solvent (electrolyte) or both may be used to manufacture a battery to prevent possible degradation of the battery due to a possible decrease in interlayer adhesion of the resin caused by dissolution of the polymer in the resin as well as a possible increase in resistance to ion flow in an electrolyte in the battery due to the dissolution of the polymer into the electrolyte.

14 Claims, 2 Drawing Sheets

(51) Int. Cl.
*H01M 10/0525* (2010.01)
*H01M 10/0569* (2010.01)
*H01M 50/403* (2021.01)
*H01M 50/417* (2021.01)
*H01M 50/426* (2021.01)
*H01M 50/434* (2021.01)
*H01M 50/443* (2021.01)
*H01M 50/446* (2021.01)
*H01M 50/451* (2021.01)

(52) U.S. Cl.
CPC ....... *H01M 50/403* (2021.01); *H01M 50/417* (2021.01); *H01M 50/426* (2021.01); *H01M 50/434* (2021.01); *H01M 50/443* (2021.01); *H01M 50/446* (2021.01); *H01M 50/451* (2021.01); *H01M 2300/0037* (2013.01)

(58) Field of Classification Search
CPC .. H01M 10/0569; H01M 50/00; H01M 50/46; H01M 50/403; H01M 50/417; H01M 50/426; H01M 50/434; H01M 50/443; H01M 50/446; H01M 50/451; H01M 50/489; H01M 2300/0037

See application file for complete search history.

(56) References Cited

U.S. PATENT DOCUMENTS

| | | | |
|---|---|---|---|
| 2006/0073345 A1* | 4/2006 | Naruse | H01M 50/451 428/421 |
| 2011/0064988 A1 | 3/2011 | Yu | |
| 2014/0239239 A1 | 8/2014 | Cha et al. | |
| 2015/0364749 A1 | 12/2015 | Kim | |
| 2019/0165359 A1 | 5/2019 | Sugihara et al. | |
| 2020/0176776 A1 | 6/2020 | Yang et al. | |
| 2021/0057705 A1 | 2/2021 | Lee et al. | |

FOREIGN PATENT DOCUMENTS

| | | | |
|---|---|---|---|
| JP | 2012-510704 A | 5/2012 | |
| JP | 5614592 B2 | 10/2014 | |
| JP | 6119547 B2 | 4/2017 | |
| JP | 2020-532845 A | 11/2020 | |
| KR | 10-2004-0005966 A | 1/2004 | |
| KR | 10-2015-0044637 A | 4/2015 | |
| KR | 10-1654042 B1 | 9/2016 | |
| KR | 10-1689753 B1 | 12/2016 | |
| KR | 10-1805544 B1 | 1/2018 | |
| KR | 10-2019-0036976 A | 4/2019 | |
| KR | 10-2019-0037149 A | 4/2019 | |
| KR | 10-2019-0062260 A | 6/2019 | |
| KR | 10-2019-0122690 A | 10/2019 | |

OTHER PUBLICATIONS

Extended European Search Report for European Application No. 21895178.8, dated Sep. 17, 2024.

* cited by examiner

METHOD FOR MANUFACTURING LITHIUM ION SECONDARY BATTERY

TECHNICAL FIELD

The present application claims priority to Korean Patent Application No. 10-2020-0157007 filed on Nov. 20, 2020 in the Republic of Korea. The present disclosure relates to a lithium secondary battery which shows low dissolution of a binder resin during the operation thereof and is prevented from an increase in viscosity of an electrolyte, and a method for manufacturing the same.

BACKGROUND ART

A lithium secondary battery is an energy storage system which has a fundamental structure of positive electrode/negative electrode/separator/electrolyte, is rechargeable through the reversible conversion between chemical energy and electrical energy, and shows high energy density. Such a lithium secondary battery has been used widely for compact electronics, such as cellular phones and notebook computers. Recently, application of the lithium secondary battery has been extended rapidly to hybrid electric vehicles (HEV), plug-in electric vehicles (EV), electric bikes (e-bikes) and energy storage systems (ESS) as a countermeasure for environmental problems, high oil price and energy efficiency and storage.

When manufacturing and using such a lithium secondary battery, it is an important technical problem to ensure the safety of a lithium secondary battery. Particularly, a separator used conventionally for a lithium secondary battery shows a severe heat shrinking behavior at high temperature due to its material property and a characteristic during its manufacturing process, thereby causing a safety problem, such as an internal short-circuit. Recently, there has been suggested an organic-inorganic composite porous separator prepared by coating a mixture of inorganic particles with a binder resin on a porous polymer substrate to ensure the safety of a lithium secondary battery. In general, the binder resin used for such a separator includes a PVDF-based binder resin. However, in this case, the interlayer adhesion in the separator is insufficient thus may cause a high risk of separation in the separator. As a result, there is a problem in that the inorganic particles separated from the porous coating layer of the separator during such interlayer separation may function as local defects in the lithium secondary device. To solve the problem, introduction of a non-crystalline polymer material, such as polyvinyl acetate (PVAc) has been suggested. However, such a non-crystalline polymer material shows high solubility in an electrolyte, and thus it may be dissolved out by the electrolyte during the operation of a battery to cause a decrease in adhesion in the separator thus an increase in separation of the inorganic particles into the electrolyte in the battery, thus resulting in degradation of the resistance characteristics of the electrolyte in the battery due to an increase in viscosity of the electrolyte. Therefore, there is a need for designing a battery in which the viscosity of an electrolyte is controlled to a predetermined level or lower.

DISCLOSURE

Technical Problem

The present disclosure is designed to solve the problems of the related art, and therefore the present disclosure is directed to providing a method for manufacturing a battery in which the viscosity of an electrolyte is controlled to a predetermined level or lower during the operation of the battery. The method for manufacturing a battery according to the present disclosure is characterized by preparing an analysis specimen for a selection of a separator and an electrolyte in advance to determine how the viscosity of an electrolyte in a battery can be decreased, and applying the selection to the manufacture of a battery. These and other objects and advantages of the present disclosure may be understood from the following detailed description. Meanwhile, it will be easily understood that the objects and advantages of the present disclosure may be realized by the means shown in the appended claims and combinations thereof.

These and other objects and advantages of the present disclosure may be understood from the following detailed description. Meanwhile, it will be easily understood that the objects and advantages of the present disclosure may be realized by the means shown in the appended claims and combinations thereof.

Technical Solution

According to the first embodiment of the present disclosure, there is provided a method for manufacturing a battery, including the steps of:

(S1) preparing an analysis specimen including a binder resin composition;

(S2) dipping the analysis specimen in an organic solvent and allowing the analysis specimen to stand in the organic solvent for a predetermined time;

(S3) removing the analysis specimen from the organic solvent, and determining the viscosity of the organic solvent; and (S4) comparing the viscosity of the organic solvent with a reference viscosity value.

According to the second embodiment of the present disclosure, there is provided the method for manufacturing a battery as defined in the first embodiment, wherein step (S2) includes allowing the analysis specimen to stand in the organic solvent in a temperature range of 23° C. to 28° C. for 24 hours or more.

According to the third embodiment of the present disclosure, there is provided the method for manufacturing a battery as defined in the first or the second embodiment, wherein the analysis specimen in step (S2) includes the binder resin composition at a ratio of 1 wt % to 10 wt % based on 100 wt % of the total weight of the organic solvent and the binder resin composition.

According to the fourth embodiment of the present disclosure, there is provided the method for manufacturing a battery as defined in any one of the first to the third embodiments, wherein when the viscosity of the organic solvent is lower than the reference viscosity value in step (S4), the binder resin composition and the organic solvent are applied to the manufacture of a battery.

According to the fifth embodiment of the present disclosure, there is provided the method for manufacturing a battery as defined in the fourth embodiment, wherein the reference viscosity value is selected from a range of 15 cP to 20 cP.

According to the sixth embodiment of the present disclosure, there is provided the method for manufacturing a battery as defined in the fifth embodiment, wherein the reference viscosity value is 17 cP.

According to the seventh embodiment of the present disclosure, there is provided the method for manufacturing a battery as defined in the fourth embodiment, wherein the organic solvent is an electrolyte in the manufacture of a battery.

According to the eighth embodiment of the present disclosure, there is provided the method for manufacturing a battery as defined in any one of the fourth to the seventh embodiments, wherein the binder resin composition is suitable as a binder for a separator in the manufacture of a battery.

According to the ninth embodiment of the present disclosure, there is provided the method for manufacturing a battery as defined in any one of the first to the eighth embodiments, wherein the analysis specimen is obtained by dissolving the binder resin composition in acetone at a concentration of 1 wt % to 10 wt % to form a solution, applying the solution to a release film to form a coated release film, and drying the coated release film under a humidified condition.

According to the tenth embodiment of the present disclosure, there is provided the method for manufacturing a battery as defined in the ninth embodiment, wherein the humidified condition includes a relative humidity ranging from 30% to 60%.

According to the eleventh embodiment of the present disclosure, there is provided the method for manufacturing a battery as defined in any one of the first to the tenth embodiments, wherein the analysis specimen includes a porous substrate for a separator and a porous coating layer on the surface of the porous substrate, the porous coating layer includes inorganic particles and a binder resin composition, and the binder resin composition includes a polymer resin.

According to the twelfth embodiment of the present disclosure, there is provided the method for manufacturing a battery as defined in any one of the first to the eleventh embodiments, which further includes a step of manufacturing a separator for a battery by using the binder resin composition as an ingredient forming the separator.

According to the thirteenth embodiment of the present disclosure, there is provided the method for manufacturing a battery as defined in any one of the first to the twelfth embodiments, which further includes step (S5) of forming an electrode assembly including a negative electrode, a positive electrode, a separator interposed between the negative electrode and the positive electrode and an electrolyte, wherein the separator includes the selected binder resin composition, and the electrolyte includes the selected organic solvent.

According to the fourteenth embodiment of the present disclosure, there is provided the method for manufacturing a battery as defined in any one of the first to the twelfth embodiments, wherein the organic solvent in step (S2) includes a lithium salt.

Advantageous Effects

According to the present disclosure, a binder resin showing a low degree of dissolution in an electrolyte is used for manufacturing a battery, and thus it is possible to prevent degradation of adhesion of battery devices, and an increase in resistance caused by an increase in viscosity of an electrolyte.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The present disclosure relates to a method for manufacturing a lithium-ion secondary battery. According to an embodiment of the present disclosure, the method is characterized in that it includes carrying out selection of a binder resin and an organic solvent for an electrolyte causing a low increase in viscosity of the electrolyte, caused by the dissolution of the binder resin.

According to an embodiment of the present disclosure, the selection includes the following steps.

First, prepared is an analysis specimen including a binder resin composition selected as an object to be analyzed (S1).

According to the present disclosure, the binder resin composition refers to a composition including at least one polymer material, i.e. one type of polymer material or a combination of two or more types of polymer materials. Herein, the polymer material is not particularly limited, as long as it may be used as a binder for a battery. In other words, the polymer material may be at least one selected from the group of candidates that may be used as a binder for manufacturing a lithium-ion secondary battery. For example, the binder resin composition may include only one type of polymer material, or may include two or more different types of polymer materials. In addition, when the binder resin composition includes two or more types of polymer materials, the weight ratio of the materials is not limited to any particular value but may vary depending on the experimental design. In other words, since the present disclosure is intended to find an optimized combination of polymer materials that may be used as a binder, there is no particular limitation in the types of polymer materials to be analyzed or weight ratio thereof.

Particular examples of the polymer materials may include PVDF-based binder resins, such as polyvinylidene fluoride, polyvinylidene fluoride-co-hexafluoropropylene and polyvinylidene fluoride-co-trichloroethylene; (meth)acrylic polymer resins, such as polymethyl methacrylate, polyethylhexyl acrylate and polybutyl acrylate; polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, and carboxymethyl cellulose. At least one of such polymer materials may be selected to prepare an analysis specimen. However, the scope of the present disclosure is not limited thereto. Besides the above-mentioned ingredients, any polymer material may be used as an object to be analyzed, as long as it may be considered as a binder that may be used for manufacturing a battery.

According to an embodiment of the present disclosure, the analysis specimen may be prepared in the form of a separator for a lithium-ion secondary battery, or in the form of an electrode for a lithium-ion secondary battery. When the analysis specimen is prepared in the form of a separator for a lithium-ion secondary battery, or in the form of an electrode for a lithium-ion secondary battery as mentioned above, it is possible to form an environment similar to an actually applicable battery, and thus to increase the reliability of the analysis result. According to another embodiment of the present disclosure, the analysis specimen may be prepared in the form of a polymer film obtained by forming a film of the binder resin composition into a sheet-like shape. When the analysis specimen is prepared in the form of a polymer film as mentioned above, it is possible to reduce the time required for carrying out the analysis process.

According to an embodiment of the present disclosure, when the analysis specimen is prepared in the form of a polymer film, the binder resin composition to be analyzed may be molten and extruded at high temperature to form a film-like shape. In a variant, the analysis specimen may be prepared by dissolving the binder resin composition to be analyzed in an organic solvent to prepare a polymer solution, applying the polymer solution to a release film, and carrying out drying to remove the solvent. The organic solvent is not particularly limited, as long as it can dissolve the binder resin composition and can be dried with ease. Particular examples of the solvent may include at least one selected from acetone, toluene, cyclohexanone, cyclopentane, tetrahydrofuran, cyclohexane, xylene and N-methyl pyrrolidone.

Meanwhile, according to an embodiment of the present disclosure, the drying process is not particularly limited, as long as it is used conventionally in the art. A process selected suitably from natural drying, air drying and heat drying may be used. In addition, the drying process may be carried out under a humidified condition of a relative humidity of 30-60% depending on the polymer material used herein.

Meanwhile, according to an embodiment of the present disclosure, when the analysis specimen is prepared in the form of a separator, the separator may have the structural characteristics as described hereinafter.

The separator includes a porous polymer substrate; and a porous coating layer coated on at least one surface of the porous polymer substrate and containing a mixture of a binder with inorganic particles, wherein the binder attaches the inorganic particles to one another so that they may retain their binding states and attaches the inorganic particles to the porous polymer substrate so that they may retain their binding states, the inorganic particles may form interstitial volumes, while being substantially in contact with one another, and the interstitial volumes among the inorganic particles become vacant spaces to form the pores of the porous coating layer.

According to an embodiment of the present disclosure, the porous polymer substrate can provide a lithium-ion channel, while insulating a negative electrode and a positive electrode electrically from each other to prevent a short-circuit, and any material may be used with no particular limitation, as long as it may be used as a material for a separator of a lithium secondary battery. Particular examples of the porous polymer substrate include a porous film or non-woven web including a polymer material. In addition, particular examples of the polymer material include at least one selected from polyolefinic polymers, such as polyethylene and/or polypropylene, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

The porous coating layer according to the present disclosure is formed on one surface or both surfaces of the porous polymer substrate in the form of a layer. The porous coating layer includes a mixture of a plurality of inorganic particles with a binder, wherein the inorganic particles are integrated by means of the binder to form a layer. The binder of the porous coating layer may attach the inorganic particles to one another so that they may retain their binding states (i.e. the binder interconnects and fixes the inorganic particles), and allows the inorganic particles to be bound to the porous polymer substrate so that they may retain their binding states. The inorganic particles of the porous coating layer may form interstitial volumes, while being substantially in contact with one another, and the interstitial volume means a space defined by the inorganic particles facing each other substantially in a closely packed or densely packed structure of the inorganic particles. The interstitial volumes among the inorganic particles may become vacant spaces to form the pores of the porous coating layer.

The weight ratio of the inorganic particles to the binder resin forming the porous coating layer may be determined considering the thickness, pore size and porosity of a finished porous coating layer. According to an embodiment of the present disclosure, the weight ratio of the inorganic particles to the binder resin may be 50-99.9 wt % or 60-99.5 wt % of inorganic particles: 0.1-50 wt % or 0.5-40 wt % of binder resin.

Meanwhile, the diameter (D50) and/or type of the inorganic particles is not particularly limited, and inorganic particles to be applied actually to the manufacture of a battery may be used to prepare an analysis specimen. For example, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable battery. Particular examples of the inorganic particles may include any one selected from $SnO_2$, $CeO_2$, MgO, NiO, CaO, ZnO, $ZrO_2$, $Y_2O_3$, $Al_2O_3$, $\gamma$-AlOOH, SiC, $TiO_2$, or the like, or a mixture of two or more of them.

The analysis specimen for a separator may be obtained according to the method for manufacturing a separator to be obtained actually. According to an embodiment of the present disclosure, the analysis specimen for a separator may be prepared as follows.

First, a suitable organic solvent is prepared, inorganic particles are mixed with a binder in the organic solvent to prepare a slurry composition for forming a porous coating layer, and the slurry composition is applied to at least one surface of a porous polymer substrate, followed by drying.

The organic solvent is not particularly limited, as long as it can dissolve the binder and can disperse the inorganic particles homogeneously. The solvent preferably has a low boiling point and high volatility, since such a solvent may be removed within a short time and at low temperature. Particular examples of the solvent include acetone, toluene, cyclohexanone, cyclopentane, tetrahydrofuran, cyclohexane, xylene, N-methyl pyrrolidone, or a mixed solvent thereof. Preferably, a solvent used actually for manufacturing a separator may be used.

Meanwhile, according to an embodiment of the present disclosure, phase separation caused by a non-solvent may be applied to the application and drying of the slurry composition. The phase separation may be carried out by humidified phase separation or dipping phase separation. The humidified phase separation is a process of introducing a non-solvent for phase separation in a gaseous state, and the dipping phase separation is a process of dipping the product coated with the slurry composition in a solidifying solution containing a non-solvent for a predetermined time. The non-solvent is not particularly limited, as long as it cannot dissolve the binder resin and has partial compatibility with the solvent. Particular examples of the non-solvent include at least one selected from the group consisting of water, methanol, ethanol, isopropanol and butanol.

The above-described method for manufacturing an analysis specimen is merely an example of various methods, and the scope of the present disclosure is not limited thereto. According to the present disclosure, a method provided for manufacturing a battery actually may be applied to prepare the analysis specimen, preferably.

Once the analysis specimen is prepared as described above, the analysis specimen is dipped in an organic solvent (electrolyte) selected as an object to be analyzed, and is allowed to stand therein for 24 hours or more (S2).

According to an embodiment of the present disclosure, the temperature of the organic solvent is maintained preferably at 23-28° C. For example, the temperature of the organic solvent may be maintained at about 25° C., while the analysis specimen is dipped therein. According to an embodiment of the present disclosure, particular examples of the organic solvent may include, but are not limited to: propylene carbonate (PC), ethylene carbonate (EC), diethyl carbonate (DEC), dimethyl carbonate (DMC), dipropyl carbonate (DPC), dimethyl sulfoxide, acetonitrile, dimethoxy ethane, diethoxy ethane, tetrahydrofuran, ethyl methyl carbonate (EMC), gamma-butyrolactone (γ-butyrolactone), fluorinated carbonate, or a mixture thereof. According to an embodiment of the present disclosure, the organic solvent may be at least one selected from the candidates considered to be used to manufacture an electrolyte of a battery actually, and may be introduced to step (S2).

Meanwhile, according to an embodiment of the present disclosure, in step (S2), the analysis specimen may be introduced in such a manner that the content of the binder resin composition (polymer material) may be 1-10 wt % based on 100 wt % of the total weight of the organic solvent and the binder resin composition (polymer material). For example, the analysis specimen may be introduced at a content of polymer material of 3-8 wt %, such as about 5 wt %, based on 100 wt % of the total weight of the organic solvent and the polymer material. However, the scope of the present disclosure is not limited thereto, and the content of the binder resin may be controlled suitably considering the amount of the binder resin present based on the total weight of the binder resin and electrolyte used for manufacturing a battery actually.

Meanwhile, according to an embodiment of the present disclosure, the organic solvent may further include a lithium salt at a concentration of 0.5-1.5 M. It is possible to form an environment close to an actual electrolyte by introducing a lithium salt. The lithium salt has a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. The lithium salt is not limited to the above examples. According to an embodiment of the present disclosure, the lithium salt may include various combinations selected from candidates considered to be used actually, and such combinations may be applied to carry out the method according to an embodiment of the present disclosure.

According to an embodiment of the present disclosure, the analysis method may be used to select a polymer material to a predetermined organic solvent (electrolyte), or to select an organic solvent (electrolyte) to a predetermined polymer material. In a variant, a different combination may be used for each test to ensure the test results for various combinations of organic solvents with polymer materials, and the analysis method may be carried out by using the combination.

After that, the analysis specimen is removed from the organic solvent, and the viscosity of the organic solvent is determined and compared with a reference value (S4). The organic solvent includes the binder resin previously contained in the analysis specimen which was dissolved out by the organic solvent, and thus shows an increase in viscosity as compared to that before the analysis specimen was wetted with the organic solvent.

The viscosity may be determined by using a conventional viscometer, and is not particularly limited. Meanwhile, as used herein, 'viscosity' means one determined under the conditions of 25° C., DV-E VISCOMETER, BROOKFIELD, 1 spindle, 100 rpm, and 60 seconds.

Viscometer: DV-E VISCOMETER, BROOKFIELD
Condition for determination of viscosity: 25° C., #1 spindle, 100 rpm, 60 sec.
Viscosity unit: cP Meanwhile, the viscosity reference value in step (S4) may be a value suitable for the operation of a battery, may be obtained experimentally and inductively, and may be selected from 15-20 cP, preferably. According to an embodiment of the present disclosure, the reference value of step (S4) may be 17 cP. When the viscosity of the organic solvent is 17 cP or less, the polymer material used for the analysis specimen, or the polymer material used for the analysis specimen and the organic solvent used for the analysis specimen are applied to the manufacture of a battery. Herein, the expression 'polymer material used for the analysis specimen is applied to the manufacture of a battery' means that the same material as the binder resin composition (polymer material) used for the analysis specimen, not the polymer material treated as an object to be analyzed, is applied to the manufacture of a battery. In addition, the expression 'organic solvent used for the analysis is applied to the manufacture of a battery' means that a solvent having the same ingredient(s) as the organic solvent used for the analysis, not the solvent used directly for the analysis, is applied to the manufacture of a battery. In other words, the product obtained after removing the analysis specimen in step (S4) is not used directly as an electrolyte.

According to an embodiment of the present disclosure, when the viscosity of the organic solvent determined in step (S4) is 17 cP or less, the polymer material may be used as a binder for a separator and/or a binder for an electrode, and the organic solvent may be used as an organic solvent for an electrolyte in the manufacture of a battery. For example, when manufacturing a battery, the binder for a separator may include only the polymer material used for preparing the analysis specimen. In addition to this, the electrolyte may include only the organic solvent ingredient(s) applied to the analysis.

If the viscosity determined by using the analysis specimen is higher than 17 cP, the binder resin composition (polymer material) used for the analysis specimen shows a high dissolution rate, or even though the dissolved content is small, the dissolved ingredient may result in an excessive increase in the viscosity of the organic solvent. On the other hand, when the viscosity determined by using the analysis specimen is 17 cP or less, the binder resin composition (polymer material) used for the analysis specimen shows a low dissolution rate, or even though the dissolved content is high, the dissolved ingredient may not affect an increase in the viscosity of the organic solvent. Therefore, when applying a polymer material and/or organic solvent having a viscosity of 17 cP or less to the manufacture of a battery, it is possible to prevent the binder resin from being dissolved in the electrolyte, and thus to maintain a level of binding force to be accomplished by the binder resin. As a result, it is possible to prevent separation (dissolution) of the inorganic particles, and to maintain the binding force for an electrode and the separator for a long time. In addition, the viscosity of the organic solvent is not increased but may be maintained at a suitable level, and thus there is no problem of degradation of battery performance caused by an increase in resistance.

In the specification, application of the selected binder resin composition to a separator is described mainly, but the selected binder resin composition may also be applied to a separator, an electrode or both.

According to an embodiment of the present disclosure, reference will be made to the above description about the analysis specimen with reference to the separator. Particularly, when the separator uses a binder, the binder may include the binder resin composition selected according to the above description. Preferably, the binder may include the selected binder resin composition alone.

According to an embodiment of the present disclosure, the electrode may be an electrode for a lithium-ion secondary battery, and may be a positive electrode and/or a negative electrode.

According to an embodiment of the present disclosure, the negative electrode may include a current collector, and a negative electrode active material layer formed on the surface of the current collector. According to an embodiment of the present disclosure, the negative electrode may be obtained by applying the negative electrode active material onto the current collector, followed by drying. If necessary, a binder and a conductive material may be further used.

According to an embodiment of the present disclosure, the negative electrode active material layer includes a negative electrode active material, a negative electrode binder and a conductive material.

The negative electrode active material is one used conventionally in the field of secondary batteries and is not particularly limited. For example, the negative electrode active material may include a carbonaceous material. The carbonaceous material may be at least one selected from the group consisting of crystalline artificial graphite, crystalline natural graphite, amorphous hard carbon, low-crystalline soft carbon, carbon black, acetylene black, graphene and fibrous carbon. Preferably, the negative electrode active material may include crystalline artificial graphite and/or crystalline natural graphite. In addition, any material that may be used as a negative electrode active material for a secondary battery may be further used. Particular examples of such a negative electrode active material may include any one selected from: lithium metal; metal composite oxides, such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; and lithium titanium oxide; or a mixture of two or more of them.

Meanwhile, according to an embodiment of the present disclosure, the positive electrode may include a current collector, and a positive electrode active material layer formed on the surface of the current collector. According to an embodiment of the present disclosure, the positive electrode may be obtained by applying the positive electrode active material onto the current collector, followed by drying. If necessary, a binder and a conductive material may be further used.

In addition, the positive electrode active material is not particularly limited, as long as it is one used conventionally in the field of secondary batteries. Particular examples of the positive electrode active material may include any one selected from the group consisting of: $LiCoO_2$, $LiNiO_2$, $LiMn_2O_4$, $LiCoPO_4$; $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic fraction of each element forming oxide, and $0 \leq x < 0.5$, $0 \leq y < 0.5$, $0 \leq z < 0.5$ and $x+y+z \leq 1$); or a mixture of two or more of them.

In general, the current collector has a thickness of 3-500 μm. The current collector is not particularly limited, as long as it has high conductivity, while not causing any chemical change in the corresponding battery. Particular examples of the current collector include stainless steel, copper, aluminum, nickel, titanium, or those materials surface-treated with carbon, nickel, titanium, silver, etc., or the like.

Meanwhile, the binder contained in the electrode may include the binder resin composition selected according to the above description. Preferably, the binder may include the selected binder resin composition alone.

According to the present disclosure, it is possible to obtain a battery having excellent electrochemical properties by identifying and selecting a binder resin for a separator and/or electrode and an organic solvent for an electrolyte, which do not cause an increase in viscosity of an electrolyte, before manufacturing a battery, and then applying the binder resin and organic solvent to the manufacture of a battery.

MODE FOR DISCLOSURE

Examples (1) Selection of Binder Resin Composition and Organic Solvent

A binder resin composition was dissolved in acetone at 5 wt %, and the resultant solution was applied to a PET film and dried under a relative humidity of 45% to prepare a binder film. Meanwhile, an organic solvent containing ethylene carbonate and ethyl methyl carbonate at a volume ratio (vol %) of 3:7 was prepared. The binder film was dipped in the organic solvent and allowed to stand therein at 25° C. for 24 hours. Then, the binder film was removed from the organic solvent to recover the organic solvent. The organic solvent was filtered by using a 300 mesh sieve. The viscosity of the resultant analysis specimen was measured by using Viscometer TV-22 (TOKI Sangyo). The viscosity was measured at 25° C. under 100 rpm. The following Table 1 shows the type and viscosity measurement result of the binder resin composition used according to each of Examples and Comparative Examples.

non-solvent. The total coating amount of the porous coating layers is 5.8 g/m². In this manner, each of the separators according to Example 1-1, Example 2-1, Comparative Example 1-1, Comparative Example 2-1 and Comparative Example 3-1 was prepared. Example 1-1 uses the binder resin according to Example 1, Example 2-1 uses the binder resin according to Example 2, Comparative Example 1-1 uses the binder resin according to Comparative Example 1, Comparative Example 2-1 uses the binder resin according to Comparative Example 2, and Comparative Example 3-1 uses the binder resin according to Comparative Example 3.

TABLE 1

|  | Solvent | Ex. 1 Set 1 | Comp. Ex. 1 Set 2 | Comp. Ex. 2 Set 3 | Comp. Ex. 3 Set 4 | Ex. 2 Set 5 |
| --- | --- | --- | --- | --- | --- | --- |
| Binder resin | No | PVDF-HFP (HFP 15%, Mw 300k) | PVAc (Mw 500k) | PVAc (Mw 500k)/PVDF-HFP (HFP 8%, Mw 300k) mixed at 9:1 (weight ratio) | PVAc (Mw 300k) | PVAc (Mw 300k)/PVDF-HFP (HFP 8%, Mw 300k) mixed at 8:2 (weight ratio) |
| Viscosity (cP) | 1.2 | 2 | 48 | 40 | 23 | 17 |

(2) Manufacture of Battery
1) Preparation of Separator

Al$_2$O$_3$ powder having a D50 diameter of 500 nm was prepared as inorganic particles, and the binder as shown in Table 1 was used. Herein, Al$_2$O$_3$ powder and the binder were prepared at a weight ratio of 80:20. The binder was dissolved in acetone as a solvent at 60° C. for about 5 hours to prepare a binder solution. Next, the inorganic particles were added to the binder solution. The binder solution containing the inorganic particles was passed through a layer including beads having a diameter of 0.65 mm three to five times by using a bead mill instrument so that the inorganic particles might be dispersed, thereby providing a composition for forming a porous coating layer. Herein, the composition for forming a porous coating layer was controlled to have a solid content of 25 wt %.

A polyethylene porous film having a size of 6 cm×15 cm was prepared as a porous polymer substrate (thickness 9 μm, porosity 43%, air permeation time 110 sec, resistance 0.45Ω).

The composition for forming a porous coating layer was applied to both surfaces of the polyethylene porous polymer substrate having a size of 6 cm×15 cm through dip coating. Then, the polyethylene porous polymer substrate coated with the composition for forming a porous coating layer was subjected to humidified phase separation, while maintaining a humidified condition of a relative humidity of 40%, thereby providing a separator for a lithium secondary battery provided with porous coating layers containing the binder mixed with the inorganic particles on both surfaces of the porous polymer substrate. In the porous coating layer, the binder attaches the inorganic particles to one another so that the inorganic particles may retain their binding states, and attaches the inorganic particles to the porous polymer substrate so that they may retain their binding states, wherein the inorganic particles form interstitial volumes, while they are in contact with one another, and the interstitial volumes among the inorganic particles become vacant spaces to form the pores of the porous coating layer. In addition, the separator has a structure in which pores are formed in the binder layer upon the exchange of the solvent with the non-solvent.

2) Manufacture of Battery

First, artificial graphite as a negative electrode active material, denka black as a conductive material and polyvinylidene fluoride (PVDF) as a binder were mixed at a weight ratio of 75:5:25, and the resultant mixture was added to N-methyl pyrrolidone (NMP) as a solvent to prepare negative electrode slurry. The negative electrode slurry was coated and dried on a copper current collector to a loading amount of 3.8 mAh/cm² to prepare a negative electrode having a negative electrode active material layer formed thereon.

In addition, LiCoO$_2$ as a positive electrode active material, denka black as a conductive material and polyvinylidene fluoride as a binder were added to N-methyl pyrrolidone (NMP) as a solvent at a weight ratio of 85:5:15 to prepare positive electrode active material slurry. The positive electrode active material slurry was coated and dried on a sheet-like aluminum current collector to form a positive electrode active material layer at a final positive electrode loading amount of 3.3 mAh/cm².

The separator was interposed between the negative electrode and the positive electrode prepared as described above, and a non-aqueous electrolyte (1 M LiPF$_6$, ethyl carbonate and ethyl methyl carbonate mixed at a volume ratio (vol %) of 3:7) was injected thereto to obtain a coin cell. In this manner, each of the batteries according to Example 1-2, Example 2-2, Comparative Example 1-2, Comparative Example 2-2 and Comparative Example 3-2 was prepared. Example 1-2 uses the separator according to Example 1-1, Example 2-2 uses the separator according to Example 2-1, Comparative Example 1-2 uses the separator according to Comparative Example 1-1, Comparative Example 2-2 uses the separator according to Comparative Example 2-1, and Comparative Example 3-2 uses the separator according to Comparative Example 3-1.

(3) Test Data
1) High-Temperature Cycle Test

Figure 1:
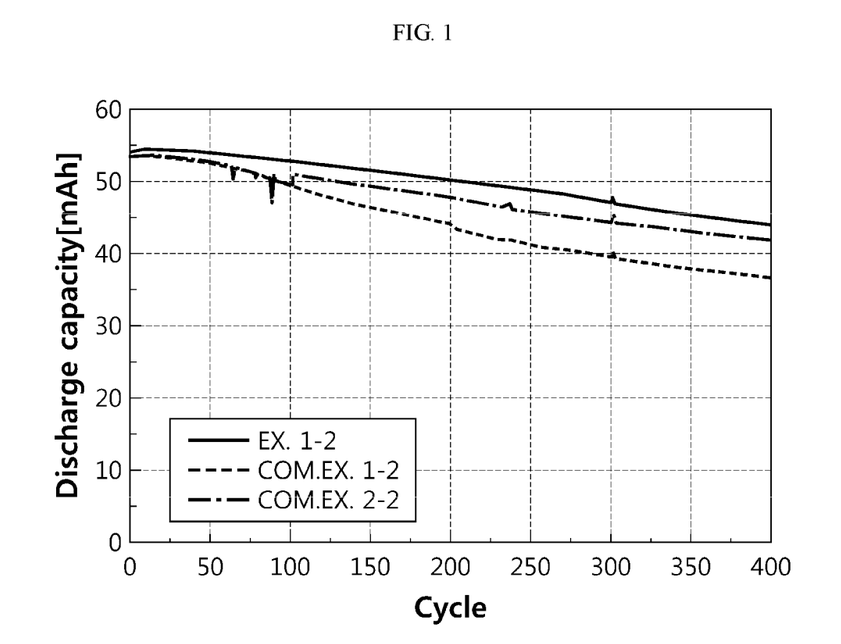
FIG. 1 is a graph illustrating the high-temperature charge/discharge characteristics and capacity retention of the battery according to each of Examples and Comparative Examples.

Each of the batteries according to Example 1-2, Comparative Example 1-2 and Comparative Example 2-2 was charged/discharged repeatedly 400 times at 45° C. The results are shown in FIG. 1. Each battery was charged in a constant current (CC)/constant voltage (CV) mode at 1 C to 4.25 V with a cut-off current of 0.05 C. Each battery was discharged in a CC mode at 1 C to 3.0 V. Referring to FIG. 1, it can be seen that the battery according to Example 1-2 shows a significantly higher capacity retention as compared to the batteries according to Comparative Examples 1-2 and 2-2.

2) Room-Temperature Cycle Test

Figure 2:
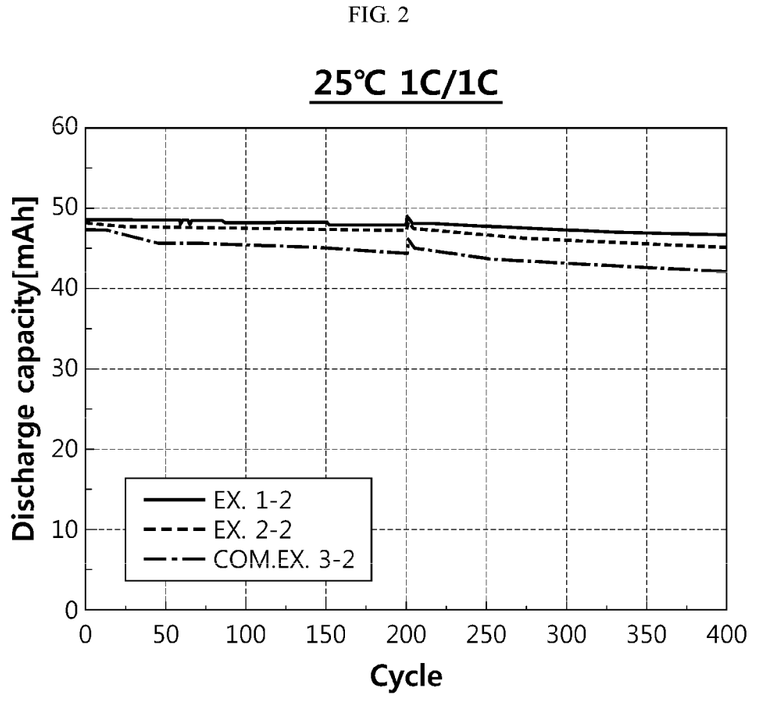
FIG. 2 is a graph illustrating the room-temperature charge/discharge characteristics and capacity retention of the battery according to each of Examples and Comparative Examples.

Each of the batteries according to Example 1-2, Example 2-2 and Comparative Example 3-2 was charged/discharged repeatedly 400 times at 25° C. The results are shown in FIG. 2. Each battery was charged in a CC/CV mode at 1 C to 4.25 V with a cut-off current of 0.05 C. Each battery was discharged in a CC mode at 1 C to 3.0 V. Referring to FIG. 2, it can be seen that the batteries according to Examples show a significantly higher capacity retention as compared to the battery according to Comparative Example 3-2. Particularly, in the case of Example 2-2, it can be seen that the specimen shows a viscosity of 17 cP, but shows a capacity retention similar to the capacity of Example 1-2. Meanwhile, in the case of Comparative Example 3-2, it can be seen that the specimen shows a small difference in viscosity as compared to Example 2-2, but shows a significantly degraded capacity retention as compared to the battery according to Comparative Example 2-2.

What is claimed is:

1. A method for manufacturing a battery, comprising the steps of:
   (S1) preparing an analysis specimen comprising a binder resin composition;
   (S2) dipping the analysis specimen in an organic solvent and allowing the analysis specimen to stand in the organic solvent for a predetermined time;
   (S3) removing the analysis specimen from the organic solvent, and determining a viscosity of the organic solvent; and
   (S4) comparing the viscosity of the organic solvent with a reference viscosity value.

2. The method for manufacturing the battery according to claim 1, wherein step (S2) comprises allowing the analysis specimen to stand in the organic solvent in a temperature range of 23° C. to 28° C. for 24 hours or more.

3. The method for manufacturing the battery according to claim 1, wherein the analysis specimen in step (S2) comprises the binder resin composition in an amount of 1 wt % to 10 wt % based on a total weight of the organic solvent and the binder resin composition.

4. The method for manufacturing the battery according to claim 1, wherein when the viscosity of the organic solvent is lower than the reference viscosity value in step (S4), the binder resin composition and the organic solvent are applied to the manufacture of the battery.

5. The method for manufacturing the battery according to claim 4, wherein the reference viscosity value is selected from a range of 15 cP to 20 cP.

6. The method for manufacturing the battery according to claim 5, wherein the reference viscosity value is 17 cP.

7. The method for manufacturing the battery according to claim 4, wherein the organic solvent is an electrolyte in the manufacture of the battery.

8. The method for manufacturing the battery according to claim 4, wherein the binder resin composition is suitable as a binder for a separator in the manufacture of the battery.

9. The method for manufacturing the battery according to claim 1, wherein the analysis specimen is obtained by dissolving the binder resin composition in acetone at a concentration of 1 wt % to 10 wt % of the binder resin composition based on 100 wt % of a total combined weight of the acetone and the binder resin composition to form a solution, applying the solution to a release film to form a coated release film, and drying the coated release film under a humidified condition.

10. The method for manufacturing the battery according to claim 9, wherein the humidified condition comprises a relative humidity ranging from 30% to 60%.

11. The method for manufacturing the battery according to claim 1, wherein the analysis specimen comprises a porous substrate for a separator and a porous coating layer on the surface of the porous substrate, the porous coating layer comprises inorganic particles and the binder resin composition.

12. The method for manufacturing the battery according to claim 1, which further comprises a step of manufacturing a separator for the battery by using the binder resin composition as a binder.

13. The method for manufacturing the battery according to claim 1, which further comprises step (S5) of forming an electrode assembly comprising a negative electrode, a positive electrode, a separator interposed between the negative electrode and the positive electrode and an electrolyte, wherein the separator comprises the binder resin composition, and the electrolyte comprises the organic solvent.

14. The method for manufacturing the battery according to claim 1, wherein the organic solvent in step (S2) comprises a lithium salt.

* * * * *